(12) United States Patent
Raynor et al.

(10) Patent No.: US 8,723,816 B2
(45) Date of Patent: May 13, 2014

(54) POINTING DEVICES

(75) Inventors: Jeffrey Raynor, Edinburgh (GB); Arnaud Laflaquiere, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 895 days.

(21) Appl. No.: 12/876,055

(22) Filed: Sep. 3, 2010

(65) Prior Publication Data

US 2011/0057906 A1 Mar. 10, 2011

(30) Foreign Application Priority Data

Sep. 9, 2009 (GB) .................................. 0915782.7

(51) Int. Cl.
*G06F 3/042* (2006.01)

(52) U.S. Cl.
USPC .......................................................... 345/173

(58) Field of Classification Search
USPC ................................................. 345/156–178
See application file for complete search history.

(56) References Cited

U.S. PATENT DOCUMENTS

| | | | |
|---|---|---|---|
| 6,333,735 B1 * | 12/2001 | Anvekar ........................ | 345/175 |
| 6,552,713 B1 * | 4/2003 | Van Brocklin et al. ....... | 345/157 |
| 7,046,230 B2 | 5/2006 | Zadesky et al. | |
| 7,348,967 B2 | 3/2008 | Zadesky et al. | |
| 2002/0066854 A1 | 6/2002 | Couillaud et al. | |
| 2006/0087495 A1 * | 4/2006 | Davis et al. .................... | 345/166 |
| 2006/0114237 A1 | 6/2006 | Crockett et al. | |
| 2007/0294638 A1 * | 12/2007 | Shim et al. ..................... | 715/822 |
| 2009/0141046 A1 | 6/2009 | Rathnam et al. | |
| 2010/0066672 A1 * | 3/2010 | Schoolcraft et al. .......... | 345/158 |

FOREIGN PATENT DOCUMENTS

| | | |
|---|---|---|
| EP | 0150904 A2 | 8/1985 |
| EP | 1059605 A2 | 12/2000 |
| WO | WO-03102751 A2 | 12/2003 |
| WO | WO-2007025858 A1 | 3/2007 |

OTHER PUBLICATIONS

Search Report, Application No. GB0915782.7, dated Jan. 18, 2010.
STMicroelectronics, "VT5366, 1.8V optical mouse sensor," ST product sheet, copyright 2006, pp. 1-30.

* cited by examiner

*Primary Examiner* — William Boddie
*Assistant Examiner* — Carolyn R Edwards
(74) *Attorney, Agent, or Firm* — Gardere Wynne Sewell LLP

(57) ABSTRACT

A touch pad uses a plurality of optical mouse type sensors. The sensors are optimized for detection of motion along the predominant direction of a user's finger as the finger is moved around the touch pad. A first one of the sensors functions to optically sense motion in a first direction, while a second one of the sensors functions to optically sense motion in a second, different, direction. The first and second directions are oriented a closed, for example, circular, path.

27 Claims, 15 Drawing Sheets

POINTING DEVICES

PRIORITY CLAIM

The present application claims priority from United Kingdom Patent Application No. 0915782.7 filed Sep. 9, 2009, the disclosure of which is hereby incorporated by reference.

TECHNICAL FIELD

The present invention relates to improvements in or relating to pointing devices, and in particular to touch pad pointing devices.

BACKGROUND

In computer systems, a pointing device is an apparatus by which a user performs an action to navigate focus to particular points on a screen of a display, usually indicated by a cursor. The most common type of pointing device is the so called mouse, which is ubiquitous as a peripheral device in the personal computer environment. Early mouse versions use a track ball, together with X and Y encoders which are rotated by motion of the track ball as it is rolled along a surface. The encoder values are then transformed into electrical signals and processed by a computer to represent an on-screen position of a cursor. Various actions can be carried out either by functional buttons provided on the mouse body, or by other peripheral devices such as keys of a computer keyboard for example. The actions taken will depend upon where the cursor is focused.

It is also known to provide optical mice, which comprise a radiation source and an image sensor. The radiation source emits radiation upon a surface and the image sensor is arranged to receive light reflected from the surface. Movement of the mouse is detected by determining the difference in the images in the X and Y directions as the mouse is moved along a surface. The radiation source typically comprises a light emitting diode (LED) that emits light in the infra-red or near infra-red spectra.

Many other types of pointing devices are known, such as track balls, touch screens, and joysticks.

One common type of pointing device is a touch pad. These are commonly provided with laptops, although they can also be provided as a stand alone device. A touch pad typically functions by measuring the change in capacitance between conductor layers that occurs when a user's finger is placed on the pad. An array of conductors is provided, so that the location of the point of incidence can be determined. The motion of the finger across the pad can therefore be used to move an on-screen cursor in a manner similar to the detected motion.

Capacitance based touch pads are also found on a variety of mobile devices. Various mobile phones and personal digital assistants (PDA's) include so called "finger mouse" touch pads, essentially being a miniature version of the touch pads normally found on laptop computers.

Other portable devices such as dedicated MP3 players comprise touch pads for scrolling through lists. For example, the popular Apple® iPoD® MP3 player comprises a capacitive scroll wheel touch pad. This is an example of a touch pad of the type comprising a closed path, which can be repeatedly navigated around by a user when scrolling through a list. Different directions of navigation along the path (for example, clockwise or anti-clockwise around a circle) give different directions of navigation along a list (up or down, in the case of a normal list, or in similar clockwise or anticlockwise directions in the case of a list or menu that has a three dimensional display effect).

A major problem is however encountered with capacitive type touch pads. They do not work in situations where a virtual connection to ground is not provided, for example if a user is wearing a glove or uses a stylus to operate the device.

It is also known to provide touch pads that use similar technology to PC based optical mice, employing image processing technology which identifies features in the image and tracks them between successive frames to determine the motion of a user's finger over a mousing surface. These "optical" touch pads can be found on some mobile devices, for example the BlackBerry® Curve 8520 mobile telephone. An optical touch pad can be referred to as a finger mouse.

An optical touch pad can be operated with a stylus or with gloved fingers, however existing designs cannot cope well with designs that involve movement in a circular motion or around some other closed path, as the user model for a personal computer is based on the assumption that most operations require either horizontal movement or vertical movement, and occasionally diagonal movement. In addition, due to the limited sensing area of existing optical touch pads with respect to the size of the human finger, it is even more difficult to perform tasks based upon movement of a finger in a circular motion or around some other closed path without having to move the finger away from the sensing area. Moving away from the sensing area requires repositioning over the mousing area for a second or further pass which creates a less enjoyable user experience and can often result in inaccurate movement.

It is therefore desirable to provide a touch pad that does not rely on capacitive methods, but that is robust for dealing with motion of a user's finger along a closed path circuit, including for example a circle or similar.

SUMMARY

According to a first aspect there is provided a touch pad pointing device comprising at least one optical mouse sensor oriented in a first direction and at least one optical mouse sensor oriented in a second, different, direction.

Optionally, the touch pad pointing device is provided with a mousing surface defining a closed path for a user pointer. The closed path is optionally in the shape of a circle.

Optionally, at least four sensors are provided, defining at least four angularly equidistant touch zones.

Optionally, the sensors and the mousing surface operate to provide frustrated total internal reflection.

Optionally, each of the sensors has the same address and a system controller has four separate ports. The ports can be I2C or SPI interfaces.

Alternatively, the sensors have the same address and a system controller has a single port and a bus multiplexer.

Alternatively, each of the sensors has different or programmable addresses and can share the same bus.

Optionally, means are provided to detect the direction of motion of a user pointer along the closed path and/or to detect the speed of motion, on the basis of a motion detection output from the sensors. This advantageously uses an optical proximity detector.

Optionally, at least one of the sensors comprises a photodetector with a linear array of pixels.

Optionally, reset periods of at least two of the sensors are offset, such that a first sensor is held in reset during an entire time period while a radiation source is illuminating a second sensor. Optionally, the first sensor is held in reset during an entire integration time period of the second sensor.

Optionally, the first and second sensors are neighbors in the array.

Optionally, the offset timing is carried out between two groups of sensors.

Optionally, the touch zones for each sensor are elongated in a direction similar to a predominant direction of motion of a user pointer for each sensor.

Optionally, the sensor arrays have a non-square aspect ratio.

Optionally, individual pixels have a non-square aspect ratio.

According to a second aspect of the invention there is provided a method of sensing motion of a user pointer on a touch pad pointing device comprising optically sensing motion in a first direction and in a second, different, direction.

Optionally, the step of optically sensing motion in a first direction is carried out at a first point along a closed path, and the step of optically sensing motion in a second direction is carried out at a second, different, point along the closed path, the closed path being defined by a mousing surface of the touch pad pointing device. The closed path is optionally in the shape of a circle.

Optionally, the method further comprises optically sensing motion in at least four different directions at different detection points along the closed path, the detection points being angularly equidistant.

Optionally, the step of optically sensing motion comprises detecting a frustrated total internal reflection signal.

The method optionally comprises addressing a plurality of sensors with the same address and providing a plurality of ports at a system controller. The ports can be I2C or SPI interfaces.

Alternatively, the method optionally comprises addressing a plurality of sensors with the same address and providing a single port and a bus multiplexer at a system controller.

Alternatively, the method optionally comprises providing a plurality of sensors with different addresses, or programming the addresses of a plurality of sensors.

Optionally, the method comprises detecting the direction of motion of a user pointer along the closed path and/or detecting the speed of motion, on the basis of a motion detection output from the sensors.

Optionally, the detection is carried out using an optical proximity detector.

Optionally, at least one of the sensors comprises a photo-detector with a linear array of pixels.

Optionally, reset periods of at least two of the sensors are offset, such that a first sensor is held in reset during an entire time period while a radiation source is illuminating a second sensor.

Optionally, the first sensor is held in reset during an entire integration time period of the second sensor.

Optionally, the first and second sensors are neighbors in the array.

Optionally, the offset timing is carried out between two groups of sensors.

BRIEF DESCRIPTION OF THE DRAWINGS

The present invention will now be described, by way of example only, with reference to the accompanying drawings in which.

DETAILED DESCRIPTION OF THE DRAWINGS

The present disclosure is concerned with touch pad devices that enable user input to be provided in the form of motion of a user pointer along a closed path. The closed path is preferably in the form of a continuous circuit, such as a circle, ellipse or the like, however the closed path may also be discontinuous. A closed path is distinguished from a generally square touch pad by the presentation to a user pointer of a predefined path to move along. The path will generally be elongated, and will for example be used for navigation among lists of information on the screen of a device incorporating or operable with the touch pad. Different directions of navigation along the path are used to achieve different directions of navigation along a list. For example, when the closed path comprises a circular or generally circular path, a clockwise movement of a user pointer along the path may result in one of an upward or downward motion of cursor focus along a list, and an anti-clockwise movement of a user pointer may result in the other of an upward or downward motion of cursor focus along a list.

The term "user pointer" encompasses any physical item or non-physical means by which a human user interacts with a touch pad to perform a pointing action. Most commonly, a user pointer will comprise a digit, such as a finger or thumb, which can be gloved or ungloved. Another common form of user pointed is a stylus. Also, multiple digits or other user pointers can be used in multitouch systems, and are herein referred to collectively as a "user pointer".

Figure 1:
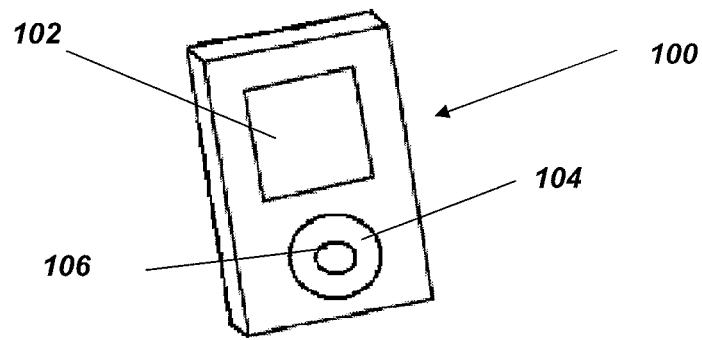
FIG. 1 shows a device incorporating a touch pad.

The touch pad may be incorporated into a device or provided as a stand alone touch pad. A preferred form of touch pad according to this disclosure has a generally annular form and can be provided as part of a mobile device such as a cell phone or MP3 player. FIG. 1 shows a mobile device 100 of this type comprising a screen 102 and user control elements which comprise a scroll wheel 104 optionally provided around a central selection button 106. The device 100 can for example be a mobile telephone, a portable MP3 player or the like. It will be appreciated that the device 100 in practice comprises many other components including other user interface controls, but that these are omitted from the diagram for ease of illustration.

Figure 2:
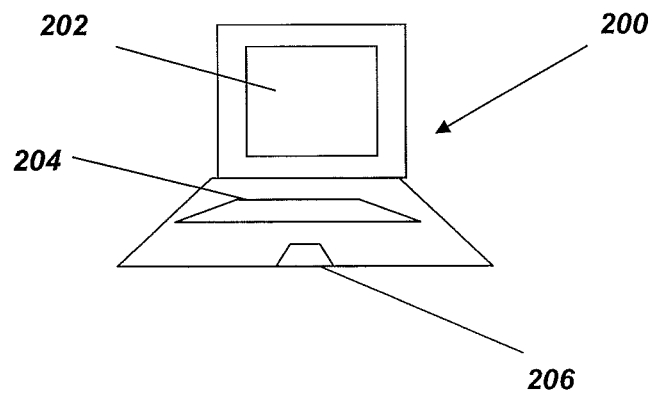
FIG. 2 shows a second device incorporating a touch pad.

FIG. 2 shows a laptop computer 200 with a screen 202. The laptop 200 is provided with a keyboard 204 and touch pad pointing device 206 for user input. A touch pad pointing device according to the present disclosure can be provided as part of the existing touch pad 206 of the laptop, or can be provided as an additional component housed in the body of the laptop 200 to further extend functionality provided to the user.

Figure 3:
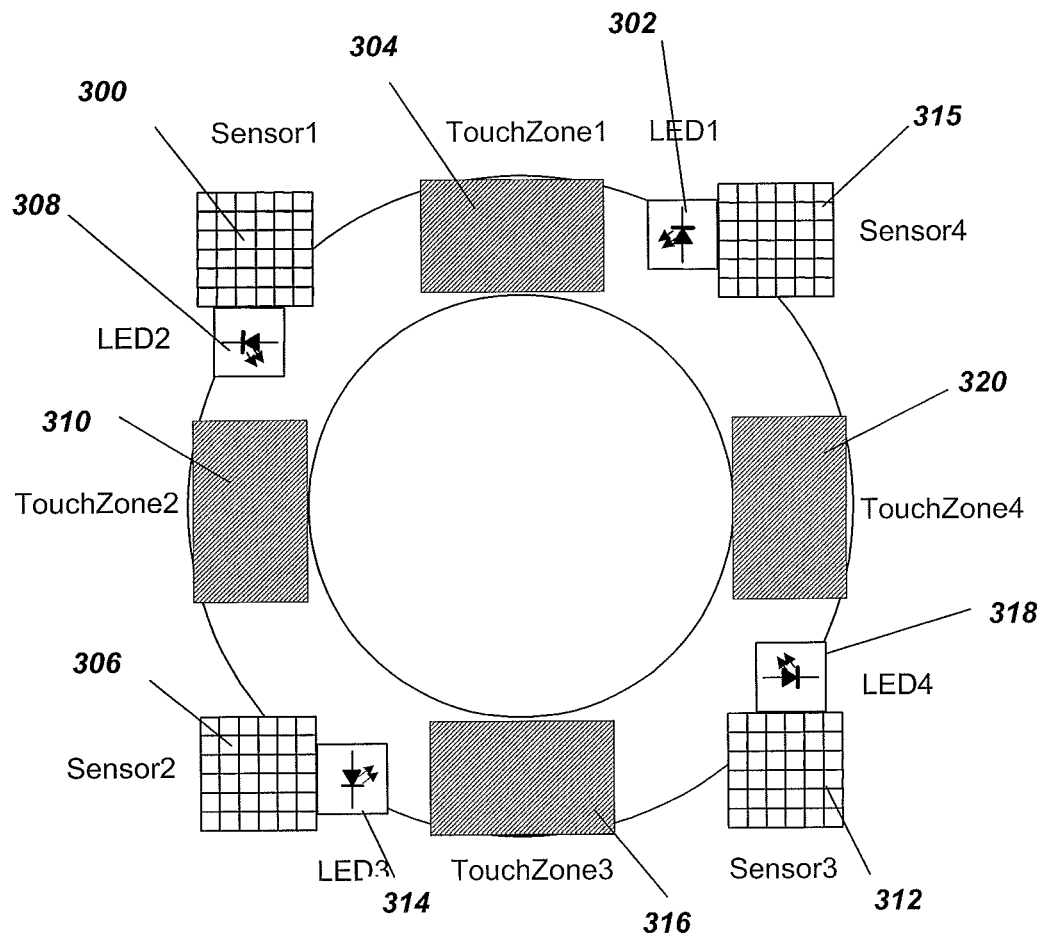
FIG. 3 shows a touch pad according to a first touch pad embodiment.

FIG. 3 illustrates a touch pad according to a first embodiment of the present disclosure in which four sensors are provided at various points along a circular circuit. Rather than using capacitive methods, the touch pad of the present disclosure involves the use of technologies similar to those found in optical mice and it will be apparent to a person skilled in the art that various components which are used in the construction of optical mice may be used in the construction of the sensors of the present disclosure.

A first sensor comprises a photodetector 300 and radiation source 302. It will be appreciated that the "sensor" may comprise other components, such as optical components. These are omitted from FIG. 3 for clarity of illustration. The radiation source 302 can in preferred embodiments emit radiation in the infra-red or near infra-red wavelengths, although other wavelengths may be used such as ultraviolet or even visible light if required. The radiation source 302 may advantageously take the form of a light emitting diode (LED), although other sources such as vertical cavity surface emitting lasers and the like may be used if required.

The photodetector 300 is arranged to detect light reflected from a touch zone 304. A "touch zone" is defined as an area over which navigation of a user pointer can be detected, i.e. the field of view of the sensor. The touch zone 304 shown in FIG. 3 is for illustration only.

The photodetector 300, radiation source 302 and touch zone 304 collectively comprise one sensor. A sensor of this type is referred to an optical mouse sensor, namely a sensor which uses a radiation source and photodetector for the detection of motion via a reflected or refracted light beam. It is to be appreciated that the mousing surface may be provided with other optical elements to enhance the detection of images.

The embodiment of FIG. 3 comprises four optical mouse sensors, labeled as a first sensor 300, 302, 304; a second sensor comprising photodetector 306, radiation source 308 and touch zone 310; a third sensor comprising photodetector 312, radiation emitter 314 and touch zone 316; and a fourth sensor comprising photodetector 315, radiation emitter 318 and touch zone 320.

Figure 4:
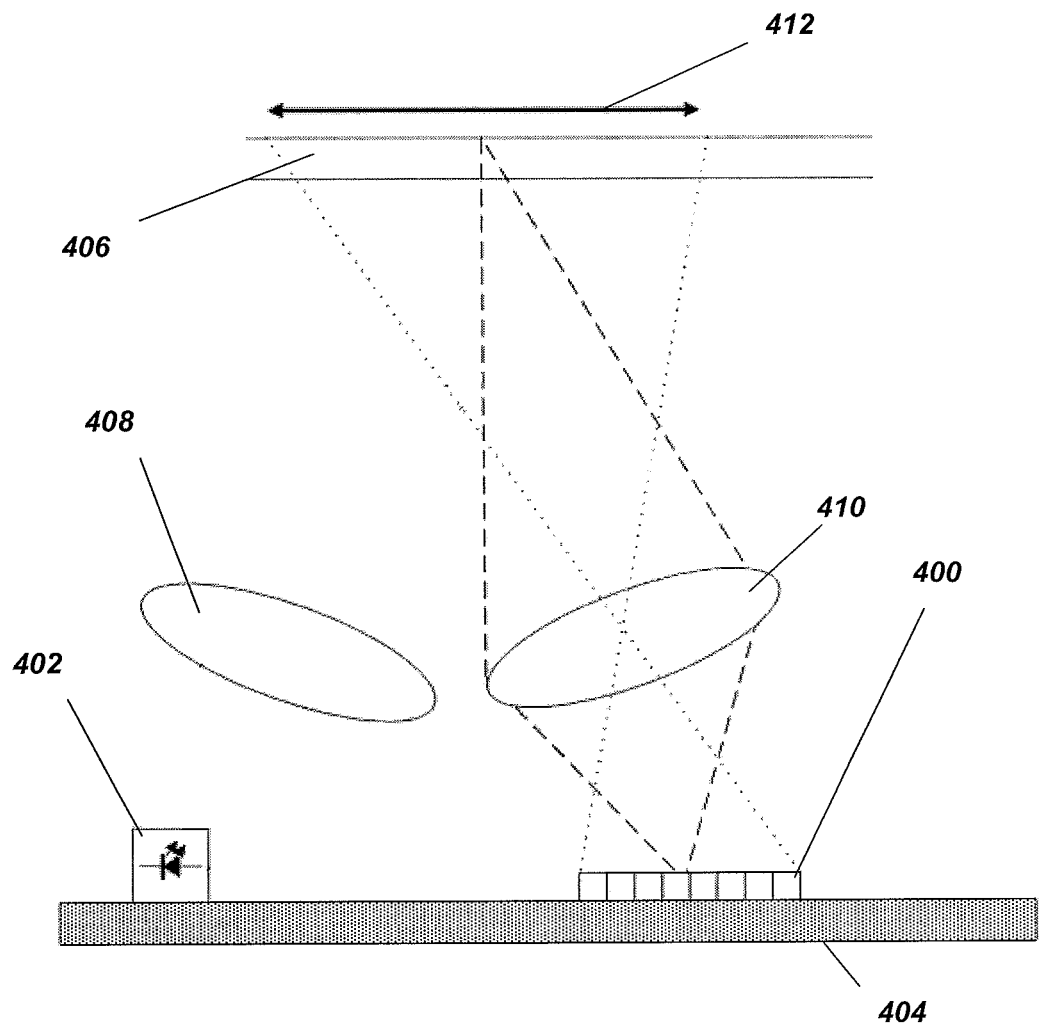
FIG. 4 shows an example image sensor arrangement.

FIG. 4 illustrates an embodiment showing an image sensor arrangement that could be used for any of the sensors of FIG. 3, or other embodiments. A photodetector 400 and radiation source 402 are provided at a substrate 404, such as a PCB. The radiation source 402 is arranged to transmit radiation in an angled upward direction towards the underside of a mousing surface 406 (that is, the surface of the touch pad which a user pointer makes contact with), through a radiation optical system 408. The radiation optical system 408 is shown as a single lens element although it is to be appreciated that multiple lenses and other optical elements could be used as appropriate. The photodetector 400 is arranged to receive light reflected back from the mousing surface 406, which is focused by photodetector optical system 410. Again, the photodetector optical system 408 is shown as a single lens element although it is to be appreciated that multiple lenses and other optical elements could be used as appropriate. The touch zone 412 corresponds to the field of view of the photodetector 400. The extent of the touch zone 412 will be defined by the characteristics and geometry of the radiation source 402, photodetector 400 and optical systems 408, 410.

When there is no contact from a user pointer, radiation will be reflected towards the photodetector 400 in a known predetermined manner. The configuration of the radiation source 402, mousing surface 406 and photodetector 400 advantageously uses total internal reflection. When a user pointer passes over the touch zone 412 the radiation incident on the photodetector 400 changes and this can be used to detect and/or analyze motion of the user pointer.

Figure 5:
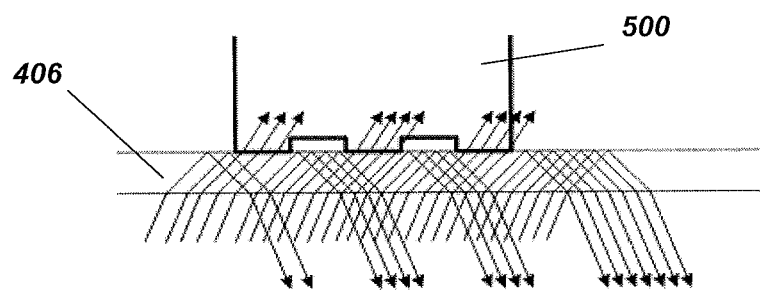
FIG. 5 illustrates the principles of frustrated total internal reflection.

When the mousing surface uses total internal reflection, the changes can be detected as a result of frustrated total internal reflection (FTIR). This is illustrated in FIG. 5. A user pointer 500 is shown in contact with the mousing surface. The user pointer in this example is a digit, such as a finger or a thumb. As shown in FIG. 5, only the epidermal friction ridges the digit make contact with the mousing surface. In a preferred embodiment, the mousing surface is formed from a plastics material and the inside of the sensor contains air. Therefore, a frustrated total internal reflection effect occurs in those portions where the digit makes contact with the mousing surface, because of the successive refractive indices of the air, plastic and flesh. It will be appreciated that any choice of materials can be used, so long as the material of the mousing surface has a refractive index that is larger than that of the medium through which the incident radiation travels, and smaller than that of the user pointer.

When incorporated with a device, the touch zones of the touch pad will have a predetermined alignment with respect to X and Y axes of a body of the device, which can for example correspond to the X and Y axes of a device display or body. In the embodiment of FIG. 3, the first and third sensors are provided such that their respective radiation sources and photodetectors are spaced from each other along the X axis (namely, horizontally as illustrated in the figure), while the second and fourth sensors comprise radiation sources and photodetectors which are spaced from each other along the Y axis (namely, vertically as illustrated in the figure). The arrangement of the respective radiation sources and photodetectors is optionally designed such that four equal sized touch zones 304, 310, 316, 320 are provided at equidistant angular positions along the path of the touch pad, in this example being spaced apart by 90° and providing an area of detection having a component that runs along the respective X and Y axes.

It is also possible for opposite sensors (first and third, second and fourth in FIG. 3) to have their radiation sources and photodetectors on opposite sides in the X/Y axis with respect to each other. This creates a uniformity of sensing operation as a user pointer is moved in a particular direction, as the photodetector will always be either in front of or behind a user pointer that is moved in one of the clockwise or anti-clockwise directions.

Figure 6:
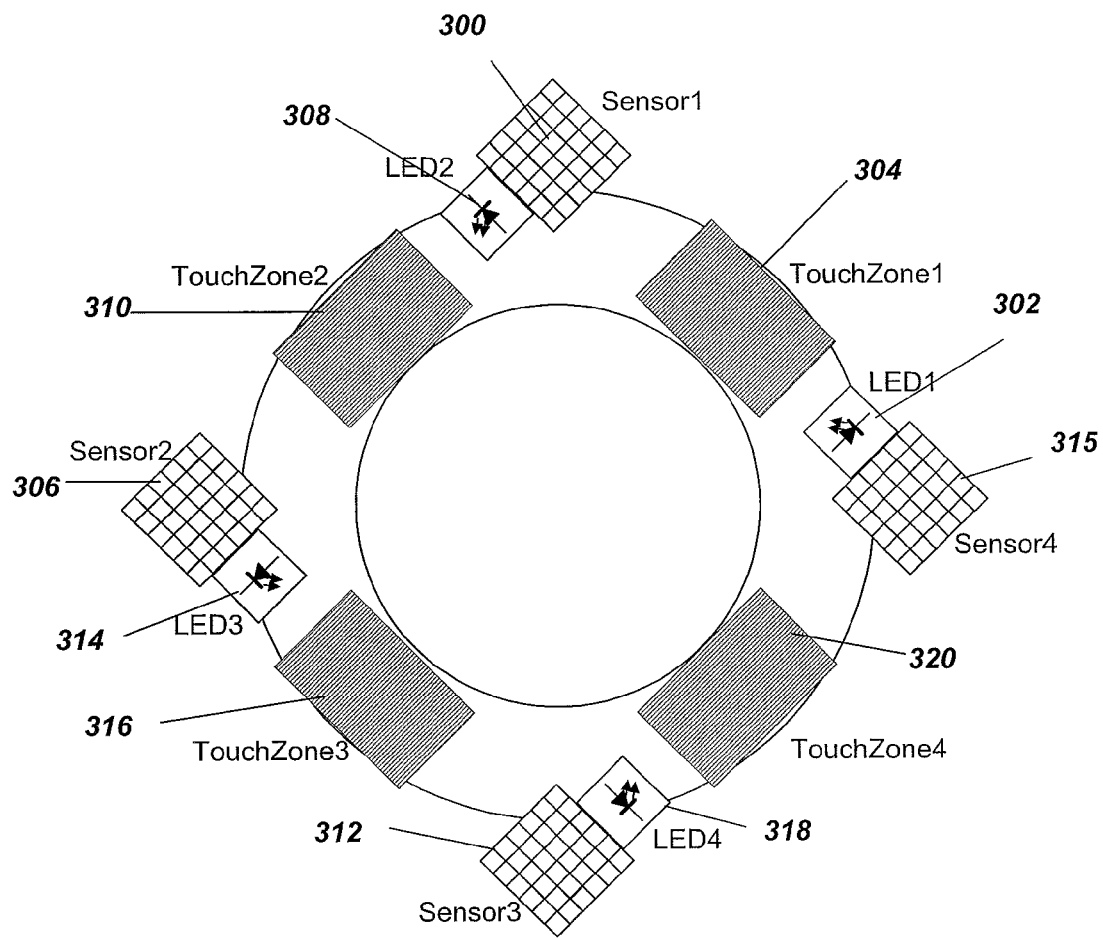
FIG. 6 shows a touch pad according to a second touch pad embodiment.

FIG. 6 shows an alternative embodiment in which like symbols are indicated with like reference numerals with respect to FIG. 3. The embodiment of FIG. 6 differs from the embodiment of FIG. 3 in that the sensor array is rotated by 45° with respect to the sensor array shown in FIG. 3.

Figure 7:
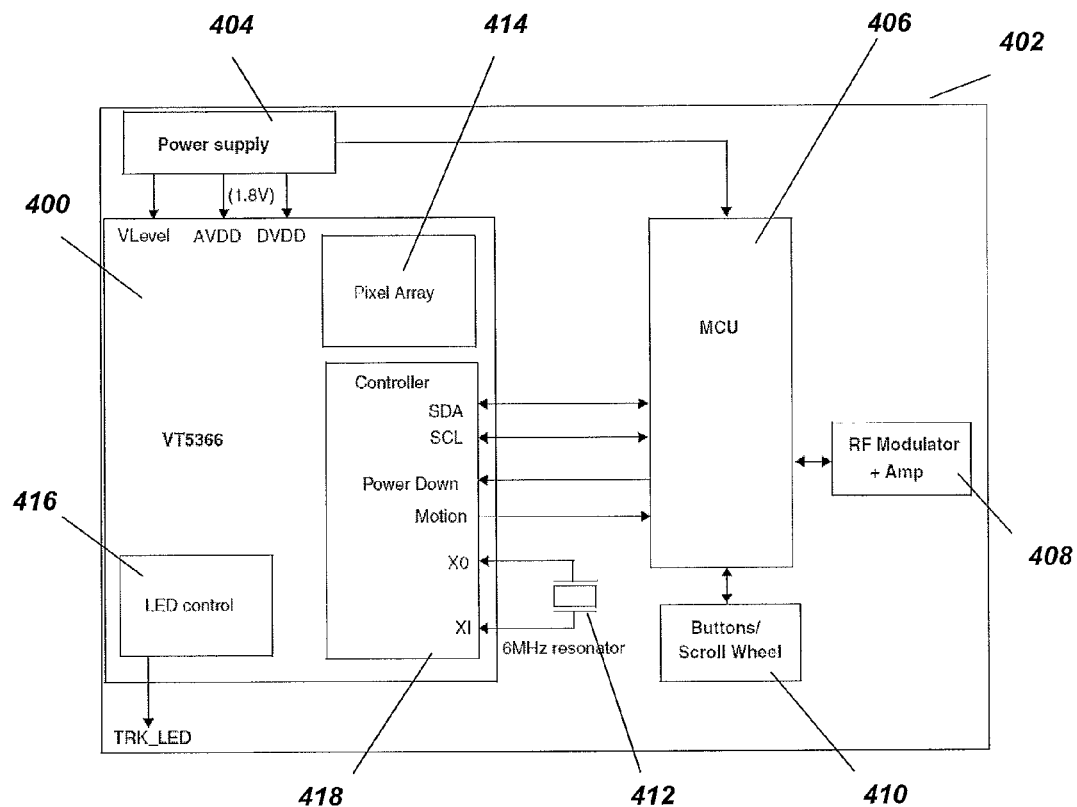
FIG. 7 is a functional diagram of an example optical mouse.

It is instructive at this point to consider how a prior art optical mouse sensor functions. For purposes of illustration, FIG. 7 shows a functional block diagram of the VT5366 1.8V optical mouse sensor, available from STMicroelectronics Inc. Other available optical mouse sensors include the VT5363, VT5365 and VT5376 products, available from the same vendor.

An image sensor chip 400 is supplied on a PCB 402 which also includes, external to the image sensor chip 400, a power supply 404, microcontroller 406, RF modulator and amplifier 408, mouse button/scroll wheel controllers 410 and a 6 MHz resonator 412 for providing a clocking function. The sensor chip 400 itself comprises a pixel array 414, LED control element 416 and controller 418.

Figure 8:
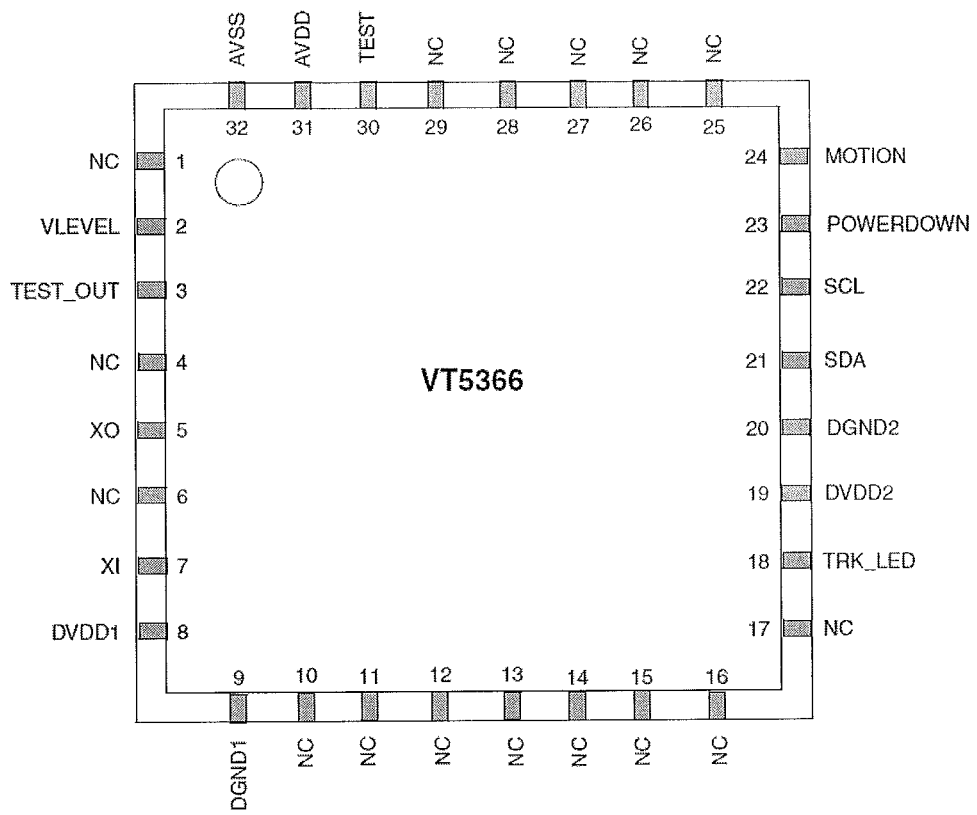
FIG. 8 illustrates the pin connections of an optical mouse sensor used in the mouse of FIG. 7.

FIG. 8 shows the pin assignment for the optical mouse sensor chip 400. The pin numbers and labels are shown in Table 1.

TABLE 1

| Pin No. | Pin name | Type | Description |
| --- | --- | --- | --- |
| 2 | VLevel | CMP | Battery voltage detection input |
| 3 | Test_Out | I/O | No Connect |
| 5 | X0 | OSC | 6 MHz resonator |
| 7 | XI | OSC | 6 MHz resonator |
| 8 | DVDD1 | PWR | 1.8 V Digital Supply |
| 9 | DGND1 | PWR | Digital Ground |
| 18 | TRK_LED | I/O | Navigation LED Output |
| 19 | DVDD2 | PWR | 1.8 V Digital Supply |
| 20 | DGND2 | PWR | Digital Ground |
| 21 | SDA | I/O | I2C SDA Line |
| 22 | SCL | I/O | I2C SCL Line |
| 23 | POWERDOWN | I/O | Wake up |
| 24 | MOTION | I/O | Motion detect |
| 31 | AVDD | PWR | 1.8 V Analog Supply |
| 32 | VSS | PWR | Analog Ground |

The VT5366 product operates from a single +1.8V supply and comprises an I2C interface and is suitable for use in all optical mice applications. The chip is housed in a 7 mm×7 mm package and the pixel array comprises 20×20 30.4 µm pixels. These values are given for reference only and for the purpose of illustration and are not limiting in any way to the scope of the disclosure.

Figure 9:
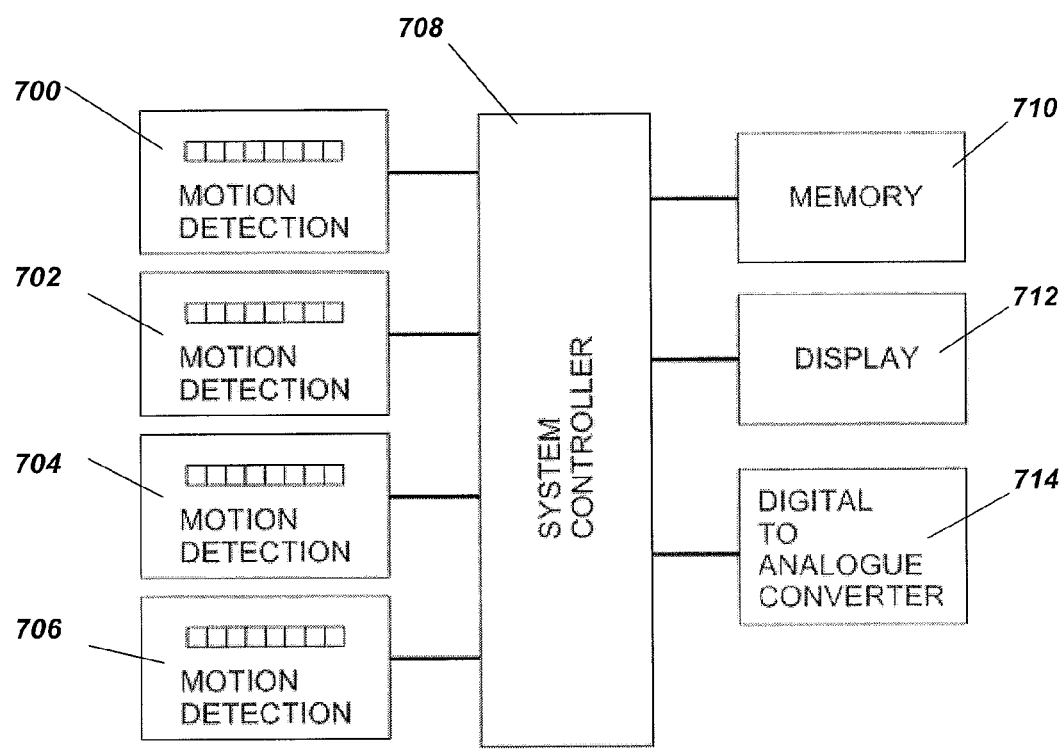
FIG. 9 shows an example system set up for implementing the touch pad of either of FIG. 3 or 6.

An example system setup for the new sensor is shown in FIG. 9. Sensors 700, 702, 704, 706 detect motion and pass information to a system controller 708, which converts the detected motion into motion of a cursor on a display 712, using memory 710 and digital to analogue convertor 714.

Most pointing devices and other human interface devices (HID's) have a single mouse sensor which has a serial output, commonly for example being I2C or SPI. The microcontroller 406 shown in FIG. 5 receives I2C data (serial data on pin 21 and serial clock on pin 22) from a single sensor 400. In contrast, the system controller 708 of FIG. 9 receives data from a plurality of sensors, 700-706.

To achieve this, it is possible to interface multiple sensors 700-706 to a system controller 708 by reusing the I2C/SPI interface of a standard microcontroller 406. In one embodiment, the devices can have the same address. In this case, the system controller 708 may either have four separate I2C/SPI ports, or the controller could have a single I2C/SPI port and a bus multiplexer used to select the appropriate device. Alternatively, each of these sensors 700-706 can have different or programmable I2C/SPI addresses and can share the same bus.

In contrast to a standard mouse sensor which needs to know precise X and Y displacements, applications and devices employing touch pads with multiple sensors according to this disclosure only need to know whether the user pointer is moving either in a first direction or a second direction (e.g. clockwise or anti-clockwise) along the path, and to determine the speed of movement (e.g. speed of rotation).

Therefore, in one embodiment, the sensors 700-706 may comprise a relatively simple optical proximity detector, for example an LED with a photodetector. Alternatively, the direction and speed information can be derived from studying the "motion detected" output from the sensors 700-706. Most mouse sensors have an output pin which signals that the sensor has detected motion (this is shown in FIG. 7 and illustrated as pin 24 in FIG. 8). This output can be used to wake up a co-processor and/or RF transmitter in a battery operated device, or to interrupt a system controller to notify it that there is some data from the mouse to be read.

Figure 10:
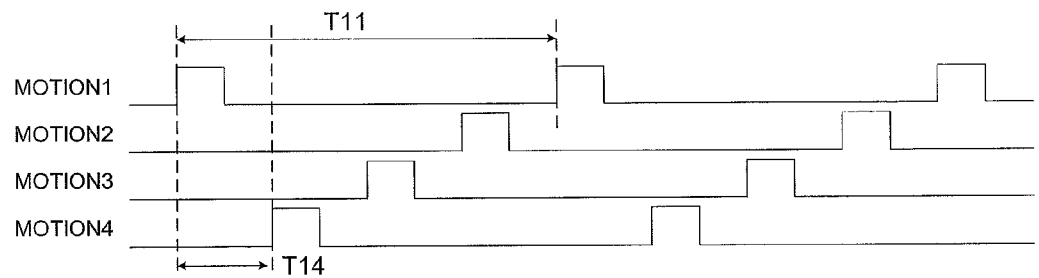
FIG. 10 shows a motion detection output from a user pointer moving clockwise, for either of the devices of FIG. 3 or FIG. 6.
Figure 11:
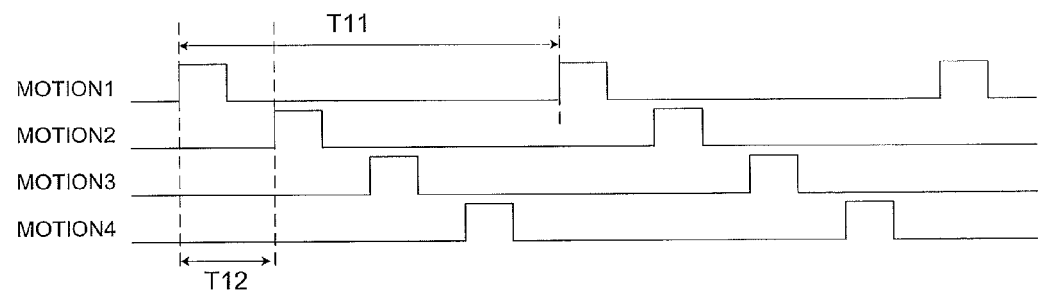
FIG. 11 shows a motion detection output from a user pointer moving anti-clockwise for either of the devices shown in FIG. 3 or FIG. 6.

The system controller 708 can interrogate the sensors 700-706 to determine which sensor is detecting motion and in which direction. By analyzing the sequence in which the "motion detection" pins of the sensors are activated and the time between these activations, both the direction and the speed of the user pointer can be deduced. An example of this analysis is shown in FIGS. 10 and 11, which illustrate the timings of a "motion detect" signal for the specific embodiments shown in FIGS. 3 and 6. Signal "MOTIONn" (n=1 to 4) goes high when sensor n as illustrated in FIGS. 3 and 6 detects motion, and Tij demotes the time period between detection of motion by sensor number i and sensor number j (i=1 to 4 and j=1 to 4), measured by the rising edge of the motion detection signals.

As can be seen from comparing FIGS. 10 and 11, the order at which the motion output pins from the sensors are activated varies depending on the direction of rotation of the user pointer. FIG. 10 shows a user pointer moving clockwise, while FIG. 11 shows a user pointer moving anti-clockwise. Furthermore, the time between the pulses, for example the time period T11, can be used to indicate the speed of the user pointer movement.

Figure 12:
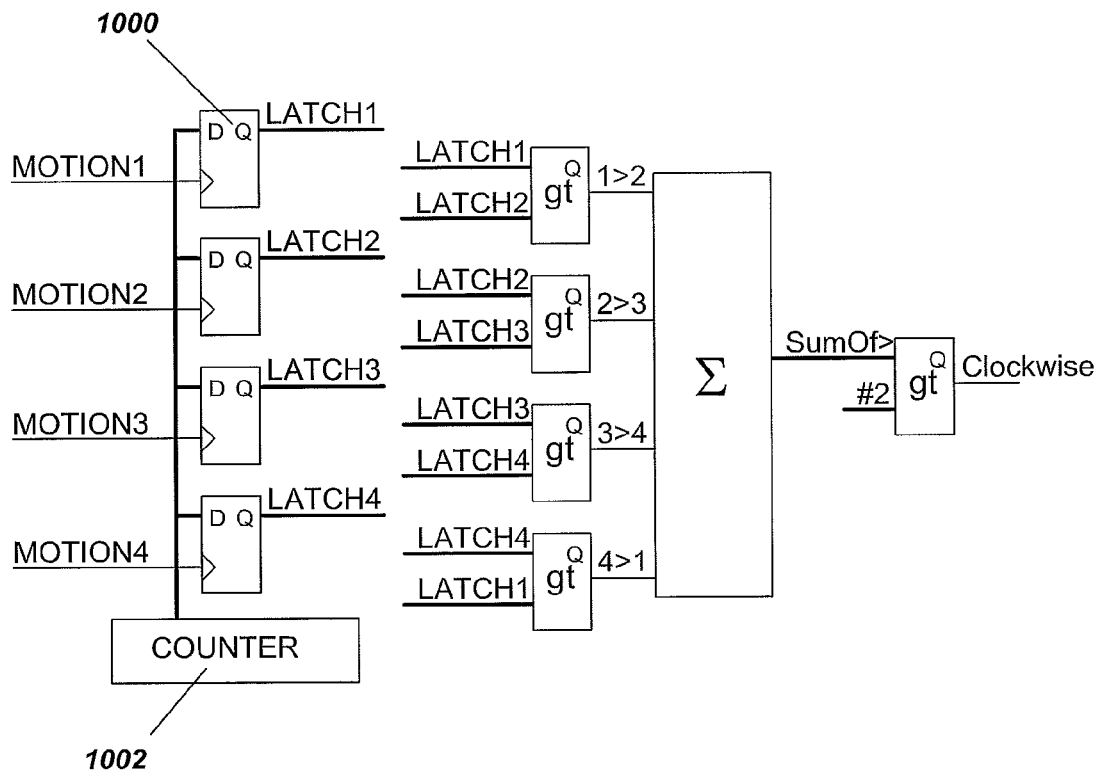
FIG. 12 shows the operation of a counter and logic control gates for determining the direction of rotational movement of a user pointer around the touch pad of either FIG. 3 or FIG. 6.

FIG. 12 shows an embodiment of an apparatus for determining the direction of rotation, using a counter and logic gates. The apparatus can be part of the system controller 708.

As shown in FIG. 12, outputs from each of the motion detection pins of the sensors are input to memory elements 1000, which in this case comprise D-type latches 1000 in which the signals from the motion detection pins are provided as clock inputs and signals from a counter 1002 are provided at the data inputs.

Figure 13:
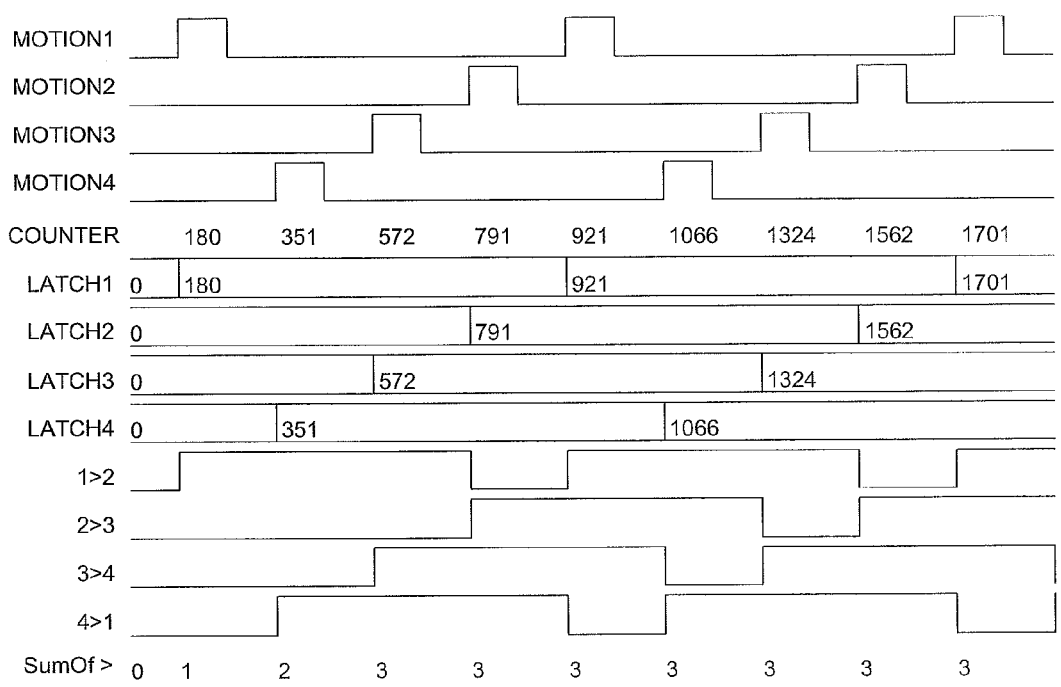
FIG. 13 illustrates operation of the counter and logic control gates of FIG. 12 for clockwise motion of a user pointer.
Figure 14:
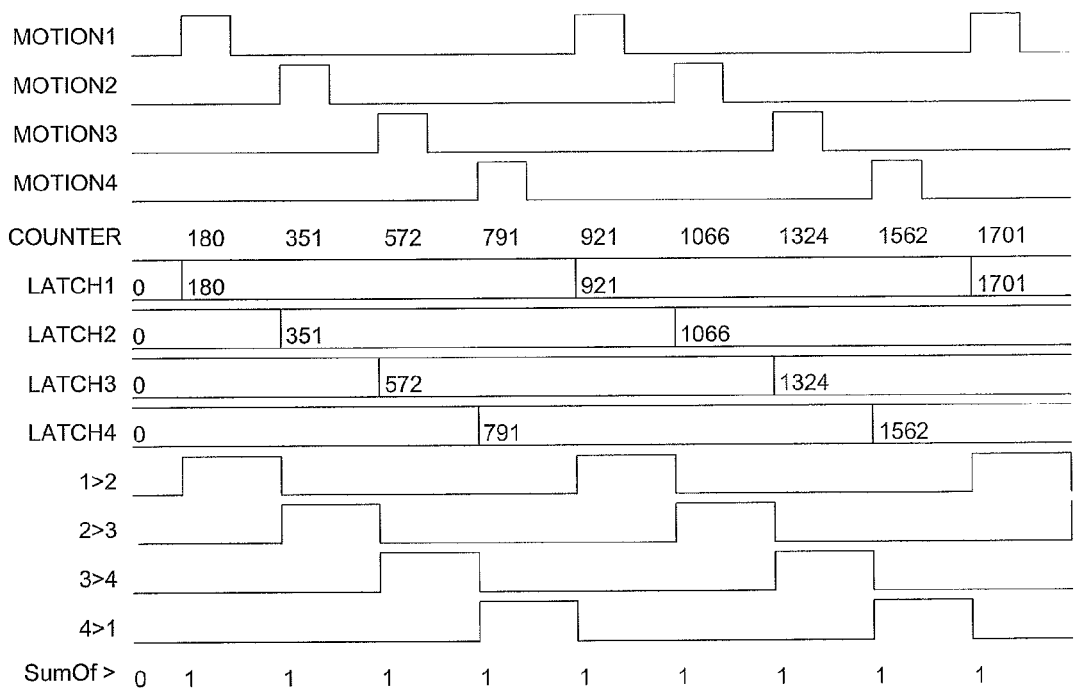
FIG. 14 illustrates operation of the counter and logic control gates of FIG. 12 for anti-clockwise motion of a user pointer.

FIGS. 13 and 14 then show how the logic of FIG. 12 operates, FIG. 13 showing operation with clockwise motion of a user pointer and FIG. 14 showing operation with anti-clockwise motion of a user pointer. As can be seen from FIGS. 13 and 14, the output from the "SumOf>" is 3 with clockwise motion and 1 with anti-clockwise motion, thus providing a basis for determining the direction of rotation of the user pointer.

The advantage of using logic such as that shown in FIG. 12 is that a separate microcontroller is not required. However, as can be seen from FIGS. 13 and 14 the apparatus of FIG. 12 can only reliably determine the direction of motion after the user pointer has moved through 180°. More sophisticated logic or the use of a microcontroller would enable the reliable determination of the direction of motion after 90°, i.e. after the user pointer has passed over two sensors.

Using the motion presence signal alone cannot detect smaller motion of the user pointer, for example oscillatory motion between touch zones. This type of motion can however be detected if the full capabilities of optical mouse sensors are utilized. A standard optical mouse sensor is operable to analyze successive frames of image data in their entirety, meaning that motion can be detected on a pixel by pixel basis. This means that small movements of a user pointer can be detected.

A mouse typically has a resolution of 800 counts per inch, namely 32 µm. If a circular touch pad having a diameter of 5 cm is provided, this corresponds to an angular displacement of 0.1°. So a "small" movement of the user pointer could be a movement of between 0.1° and 1° for example, the lower end of this range corresponding to a maximum possible sensitivity and the upper end of this range being essentially an arbitrary choice.

One potential problem with a touch pad as shown in FIGS. 3 and 6 is that the radiation sources of each sensor are placed close to photodetectors of other sensors. This can lead to some radiation from a given radiation source impinging directly on a photodetector that is associated with a different sensor, thus creating noise. The problem is particularly acute for example when LED's are used, as typically LED's have a small size and tend to have a large beam angle.

It is possible to solve this problem by increasing the distance between the radiation sources and photodetectors from different sensors, however this in itself increases the size of the overall module. An alternative solution is to place a physical barrier between the radiation sources and the photodetectors. However, this adds to manufacturing complexity and cost.

In a still further alternative solution, it is possible to eliminate the problem electronically. This is achieved by offsetting the time at which neighboring sensors are in reset, so that the photodetector of one sensor is held in reset while the photodetector of the neighboring sensor is in integration.

Figure 15:
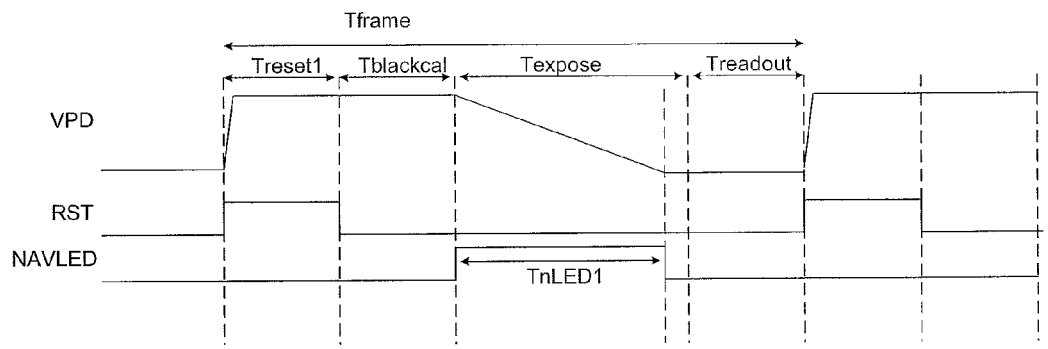
FIG. 15 shows a typical timing diagram for operation of one of the sensors shown in FIG. 3 or FIG. 6 according to a first embodiment sensor operation method.

FIG. 15 illustrates a typical operation of a sensor, showing how the various control voltages are applied over time. The time period Tframe is a frame time. During a reset time period Treset 1, a reset signal RST is held high and the voltage on the photodetector (VPD) goes high. At this point the LED remains switched off, represented by the low signal on NAV-LED. The reset signal is then switched low, but the LED is kept off for a period labeled Tblackcal, for the background "black" signal to be calculated. The LED is then switched on and the voltage on the photodiode starts to decay. The LED is kept on for an illumination period TnLED1, during which the voltage on the photodiode VPD decays rapidly. The LED is then switched off and a short time later, at the end of an exposure period Texpose, the voltage on the photodiode VPD is read out. At the end of the read out period Treadout the reset signal is again switched high, commencing the next frame of data. In FIG. 15 the subscript "1" refers to the corresponding numbered sensor.

Figure 16:
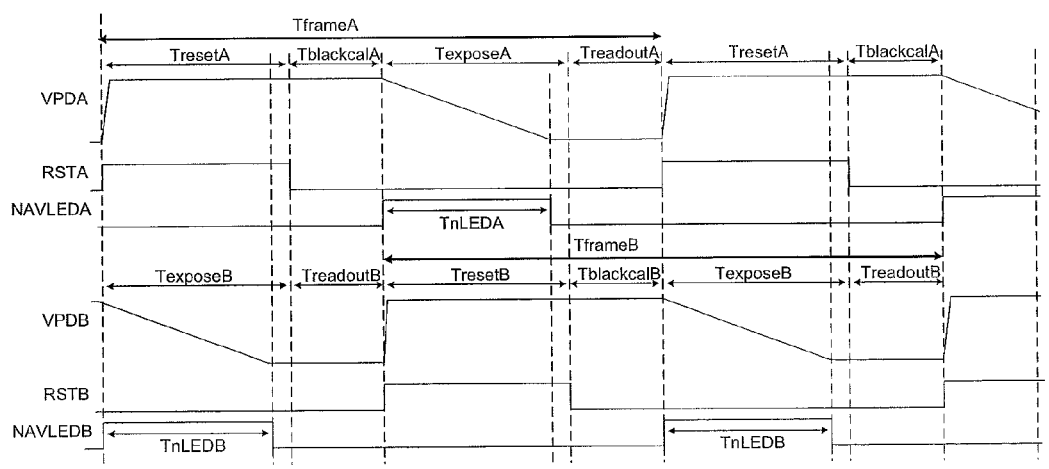
FIG. 16 shows the operation of two different sensors with offset reset periods, according to a second embodiment sensor operation method.

FIG. 16 shows how two sensors, A and B, can have their operation offset according to an embodiment of the disclosure. Each of the time periods and voltage signals are similar to those illustrated in FIG. 15, with the subscripts A and B used to denote association of an appropriate time period or voltage with either of the sensors A or B. In this modified timing, the reset periods TresetA and TresetB are extended as compared with the timing of FIG. 15 so that they last for the entire duration of the time when the LED of the other sensor is switched on, and optionally for the entire exposure period. One sensor is in reset i.e. insensitive to light, while the other is integrating.

In the timing of FIG. 15, the period of reset is typically short, typically around 10 µs. This limit is governed by the readout speed as it is during this phase that the data from the previous frame is read out from the image sensor. Prior art sensors aim to maximize the frame rate for best tracking performance. However, in contrast, these embodiments of the present disclosure increase the length of the reset period to that of the integration period, and then two opposing sensors are operated in synchronized offset.

The maximum period of TnLEDB is governed by the system design. The actual time period can be controlled by an automatic exposure system to be suitable for the operation of a particular sensor, namely to make sure that the magnitude of the photodiode voltage decay is not larger than either that supported by the pixel, or limited by the ADC.

A system with an even number of sensors can operate in two groups, optionally with neighboring sensors being allocated to different groups. In the example of FIGS. 3 and 6, sensors 1 and 3 can be operated according to the sensor A timing of FIG. 16, while sensors 2 and 4 can be operated according to the sensor B timing of FIG. 16; or vice versa.

FIGS. 15 and 16 refer to an "LED" however the same principles can of course apply to other radiation sources.

As mentioned above, standard PC optical mice have a 2D pixel array and sense motion in X and Y axes. In a preferred embodiment of this disclosure image sensors can be placed such that their pixel arrays are arranged along an axis along which there will be a predominant direction of movement along the touch pad path. For example, in the circular touch pad arrangement of FIGS. 3 and 6, a user pointer will rotate around the annulus and so motion at the touch zones 310 and 320 will predominantly in the Y axis (in opposite Y-directions), while motion at the touch zones 304, 316 will predominantly be in the X axis (in opposite X-directions). Similarly, the touch zones shown in FIG. 4 will generally be associated with a predominant direction of motion, which is in fact tangential to the path of the user pointer.

In prior art optical mice a reduction in the height of a module can result in geometrical distortion of the image as the magnification and resolution in the different axes (X, Y) may not be the same depending on the optics used. This is because a reduction in the height of a module means reducing the distance between the navigation surface and the sensor and/or light source, which in turn increases the angle to the normal of the radiation beam. This is a marked disadvantage for a prior art optical mouse, because a user is as likely to move in one axis as they are in the other and so having different performance between the two axes is a disadvantage.

However, for motion along a circular or other touch pad path, the geometrical distortion is not a disadvantage as the path of the motion of the user pointer at any one point will be predominantly tangential to the path.

To take account of the greater sensitivity that will be required or beneficial in one direction as compared with the other direction, various embodiments of the disclosure therefore provide an elongated touch zone. To enable this, different sensor array designs can be incorporated. One design is to provide photodetectors that have an elongated array of pixels, namely one in which the number of rows is less than the number of columns (or vice versa depending on the geometry). Another design is to elongate the light sensitive area of each individual pixel in the array of the photodetectors, while in a further design an elongated touch zone can be achieved by forming the optical system to have different magnifications in the X and Y directions.

In a further embodiment, a linear array of pixels can be provided. The pixels in the linear array can themselves also be elongated with respect to standard designs.

The use of linear pixel arrays is advantageous. As well as saving silicon area required for the photodetector, the storage and processing requirements are reduced, allowing for a smaller and cheaper device to be used.

Figure 17:
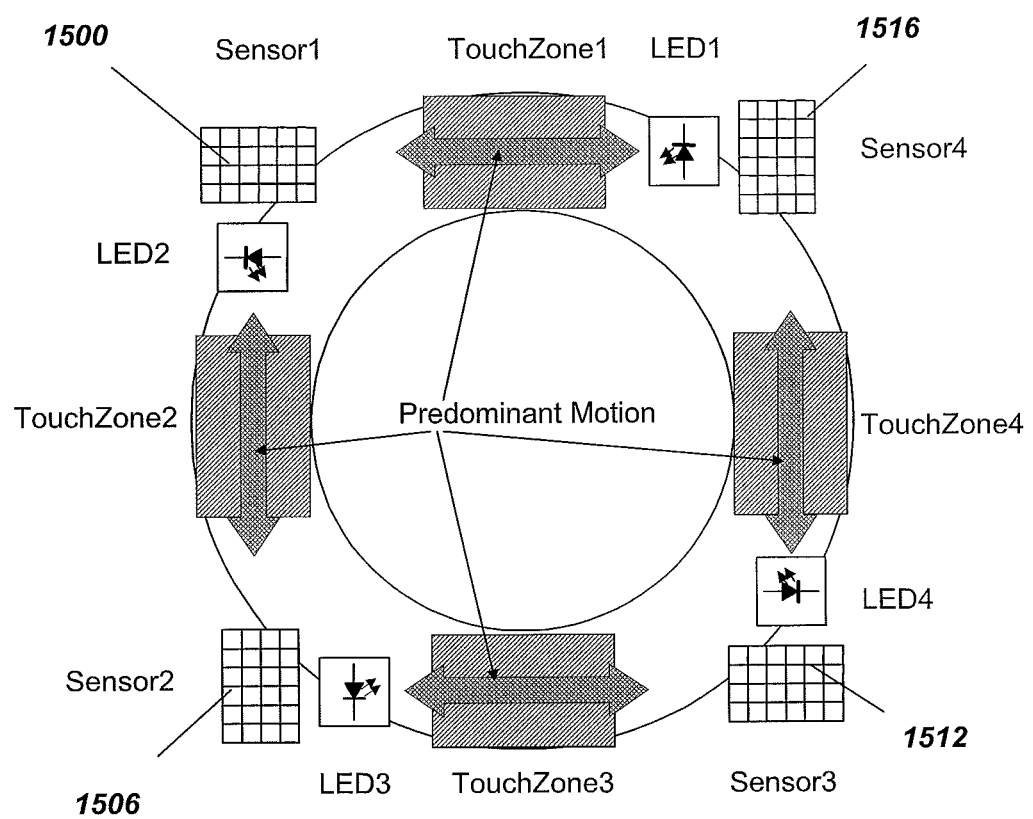
FIG. 17 shows a touch pad device according to an alternative touch pad embodiment, in which an elongated sensor array and/or touch zone is provided.

FIG. 17 illustrates an approach where each of the photodetectors 1500, 1506, 1512 and 1516 has a non square aspect ratio. Typical or standard mouse sensors have a 1:1 aspect ratio, however a mouse sensor for use with a touch pad of the disclosure may have a non-square aspect ratio, for example, 2:1. The pixel array can preferably be arranged such that the larger array dimension is arranged parallel to the direction of travel of the user pointer.

In the example of FIG. 17, the 6×6 sensor arrays of FIGS. 3 and 6 are replaced with 6×4 sensor arrays. Effectively this can be thought of as removing a number of rows of columns of the array. As well as saving the amount of area of silicon required on the sensor, the lower number of pixels reduces the area required to incorporate memories required for the mouse navigation engine.

In FIG. 17 the predominant direction of motion of a user pointer is shown by the double headed arrows. Touch zones and radiation emitters are illustrated by similar drawing elements in FIG. 17 as are seen in FIGS. 3 and 6.

Figure 18:
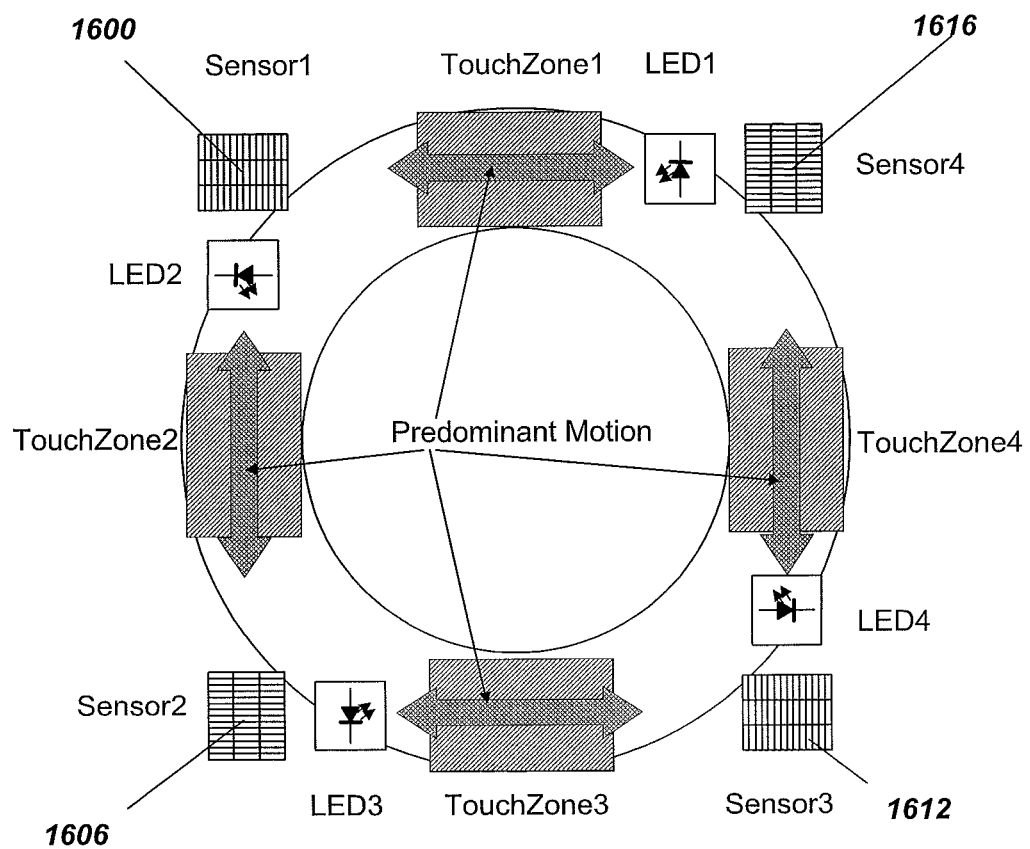
FIG. 18 shows a touch pad device according to a further touch pad embodiment, in which individual pixels of each image sensor array are elongated.

A further saving could be achieved by changing the aspect ratio of individual pixels, as illustrated in FIG. 18. Again, in standard mouse sensors the pixels are square, but here also each individual pixel of the sensor 1600, 1606, 1612 and 1616 has a non-square aspect ratio. The larger pixel dimension is in a direction perpendicular to the predominant direction of user pointer motion for the sensor of which the pixel is part, while the smaller pixel dimension is in a direction parallel to the predominant direction of user pointer motion for the sensor of which the pixel is part. This increases the sensor's spatial accuracy, however for a given unit area this is at the expense of having more pixels and a corresponding increase in memory requirements. However, the same number of pixels can be shrunk into a smaller area if required.

Figure 19:
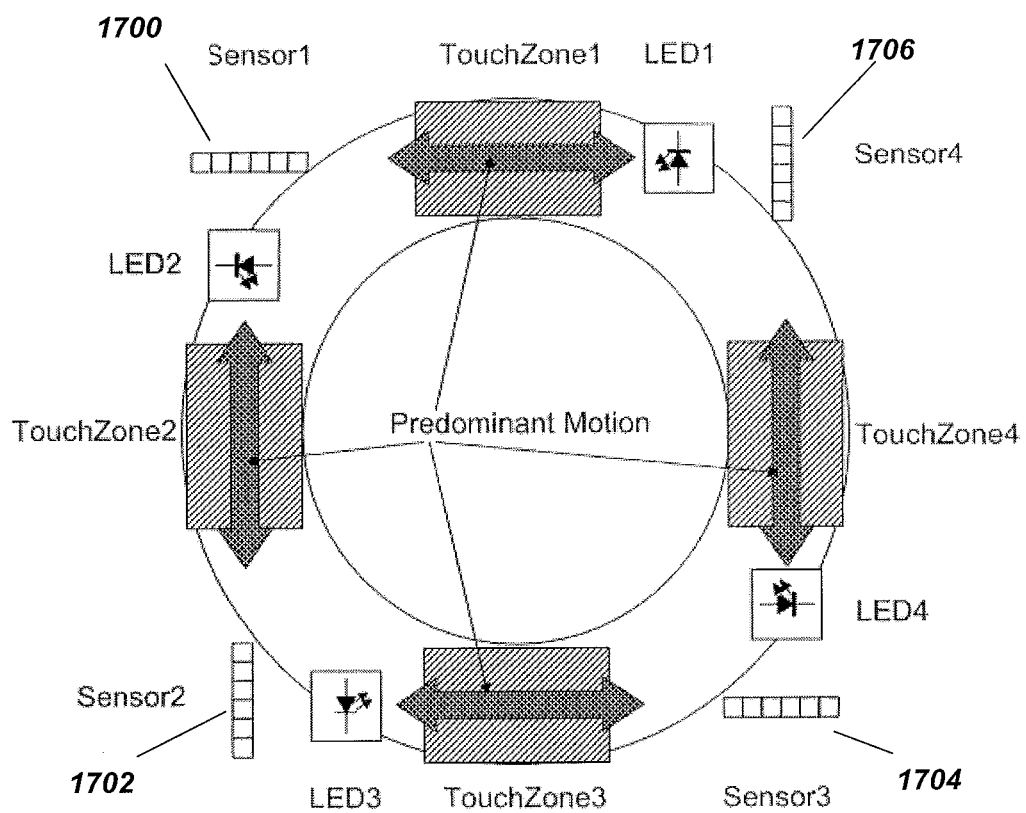
FIG. 19 shows a touch pad device according to still further embodiment, in which linear pixel array photodetectors are provided.

FIG. 19 shows another embodiment, in which the photodetectors 1700, 1702, 1704 and 1706 comprise linear pixel arrays. The advantages of linear arrays are discussed above.

A further advantageous side effect of the arrangements shown in FIGS. 17-19 is that the radiation emitters of each sensor can be further separated from the photodetectors of neighboring sensors. Alternatively, the space saving could be used to produce the same resolution of sensing with a smaller diameter or smaller characteristic dimension touch pad.

In one embodiment a pixel aspect ratio could be set to the inverse of the magnification produced by the optical system, for example if the optical system had a magnification of 0.25 in the X axis and 0.5 in the Y axis then the pixels should have an aspect ratio of 2:1, in order to restore the spatial resolution of the mouse.

A pixel with a non-square aspect ratio would suffer more cross-talk in the direction corresponding to the smaller dimension of the pixel as compared with the other direction. Greater levels of crosstalk could reduce a system's MTF (modulation transfer function), degrade the contrast and reduce navigational performance. To combat this, the sampling frequency should be increased. For example, instead of including pixels with an X dimension of 15 µm and Y dimension of 30 µm, the X dimension could be reduced further to, for example, 12 µm. Even though these pixels will have even more cross talk than the 15 µm wide pixels, there will be more of them and so there will be more spatial information.

Various improvements and modifications can be made to the above without departing from the scope of the invention. The disclosure has focused mainly on the field of mobile devices, however it will be appreciated that the touch pad of the disclosure can be used in various non-mobile environments such as audio or video mixing desks or as a complement to pointing devices used in a standard computing environment. Also, while the principles of the invention have been described with respect mainly to a circular touch pad, it will be appreciated that the principles can be trivially extended to the case of an elliptical touch pad, and also that more complex shapes can be used, so long as a closed path is defined along which there is a first direction of motion and a second direction of motion. Furthermore, references are made to photodetectors but it will be appreciated that other equivalent radiation sensitive elements may be used.

What is claimed is:

1. A touch pad pointing device comprising:
a mousing surface defining a closed path for a user pointer;
a first optical mouse sensor having an imaging region through which the closed path passes that is oriented in a first direction, the first optical mouse sensor configured to detect presence and motion of the user pointer at the imaging region in the first direction and generate a first motion signal indicative of the detected motion;
a second optical mouse sensor having an imaging region through which the closed path passes that is oriented in a second, different, direction, the second optical mouse sensor configured to detect presence and motion of the user pointer at the imaging region in the second direction and generate a second motion signal indicative of the detected motion; and
a detector provided to detect direction of motion of a user pointer along the closed path and to detect speed of motion along the closed path on the basis of relative timing of the first and second motion signals output from the first optical mouse sensor oriented in the first direction and the second optical mouse sensor oriented in the second direction.

2. The touch pad pointing device of claim 1, wherein the closed path is in the shape of a circle.

3. The touch pad pointing device of claim 1, wherein at least four optical mouse sensors are provided, defining at least four angularly equidistant touch zones.

4. The touch pad pointing device of claim 1, wherein the optical mouse sensors and the mousing surface operate to provide frustrated total internal reflection.

5. The touch pad pointing device of claim 3, wherein each of the sensors has the same address and a system controller is provided that has four separate ports.

6. The touch pad pointing device of claim 5, wherein the ports are $I^2C$ or SPI interfaces.

7. The touch pad pointing device of claim 1, wherein the optical mouse sensors have the same address and a system controller has a single port and a bus multiplexer.

8. The touch pad pointing device of claim 1, wherein each of the optical mouse sensors has different or programmable addresses and can share the same bus.

9. The touch pad pointing device of claim 1, wherein each of the optical mouse sensors comprises an optical proximity detector configured to detect both direction of motion and speed of motion.

10. The touch pad pointing device of claim 1, wherein each of the optical mouse sensors comprises a photodetector with a linear array of pixels.

11. The touch pad pointing device of claim 1, wherein reset periods of the optical mouse sensors are offset, such that the first optical mouse sensor is held in reset during an entire time period while a radiation source is illuminating a second optical mouse sensor.

12. The touch pad pointing device of claim 11, wherein the first optical mouse sensor is held in reset during an entire integration time period of the second optical mouse sensor.

13. The touch pad pointing device of claim 11, wherein the offset timing is carried out between two groups of optical mouse sensors.

14. The touch pad pointing device of claim 1, wherein imaging region for each optical mouse sensor is elongated in a direction of a predominant direction of the closed path passing through the imaging region.

15. The touch pad pointing device of claim 1, wherein each optical mouse sensor includes a sensor array having a non-square aspect ratio.

16. The touch pad pointing device of claim 1, wherein each optical mouse sensor includes a sensor array and wherein individual pixels in the sensor array have a non-square aspect ratio.

17. A method of sensing motion of a user pointer on a touch pad pointing device comprising:
    optically sensing motion in a first direction at a first point along a closed path;
    optically sensing motion in a second, different, direction at a second, different, point along the closed path;
    wherein the closed path is defined by a mousing surface of the touch pad pointing device;
    detecting a direction of motion of a user pointer along the closed path on the basis of a motion detection signal output from an optical mouse sensor located at each of the first and second points; and
    detecting a speed of motion of the user pointer along the closed path on the basis of the relative timing of the motion detection signals output from said optical mouse sensors located at the first and second points.

18. The method of claim 17, wherein the closed path is in the shape of a circle.

19. The method of claim 17, further comprising optically sensing motion in at least four different directions at different detection points along the closed path, the detection points being angularly equidistant.

20. The method of claim 17, wherein the step of optically sensing motion comprises detecting a frustrated total internal reflection signal.

21. The method of claim 17, wherein the detection is carried out using an optical proximity detector of the optical mouse sensor.

22. The method of claim 17, wherein reset periods of at least two of the optical mouse sensors are offset, such that a first optical mouse sensor is held in reset during an entire time period while a radiation source is illuminating a second optical mouse sensor.

23. The method of claim 22, wherein the first optical mouse sensor is held in reset during an entire integration time period of the second optical mouse sensor.

24. The method of claim 23, wherein the offset timing is carried out between two groups of optical mouse sensors.

25. A touch pad pointing device, comprising:
    a mousing surface defining a closed curved path for a user pointer;
    a first optical frustrated total internal reflection sensor configured to make a detection of user pointer movement in a movement detection direction oriented in a first direction tangential to the closed curved path, said first optical frustrated total internal reflection sensor positioned at a first location along the closed path and further configured to output a first signal indicative of movement detection;
    a second optical frustrated total internal reflection sensor configured to make a detection of user pointer movement in a movement detection direction oriented in a second direction tangential to the closed path, said first optical frustrated total internal reflection sensor positioned at a second, different, location along the closed curved path and further configured to output a second signal indicative of movement detection; and
    a processing circuit coupled to receive the first and second signals and configured to detect movement of the user pointer and speed of movement of the user pointer along the closed curved path in response to relative timing of the first and second signals.

26. The device of claim 25 wherein each optical frustrated total internal reflection sensor comprising a plurality of sensor pixels arranged in an array.

27. The device of claim 25, wherein each optical frustrated total internal reflection sensor comprises an optical proximity detector.

* * * * *